(12) United States Patent
Kale

(10) Patent No.: US 12,299,110 B2
(45) Date of Patent: May 13, 2025

(54) DEEP LEARNING ACCESS AND AUTHENTICATION IN A COMPUTING ARCHITECTURE

(71) Applicant: Micron Technology, Inc., Boise, ID (US)

(72) Inventor: Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 270 days.

(21) Appl. No.: 17/808,921

(22) Filed: Jun. 24, 2022

(65) Prior Publication Data

US 2023/0418925 A1    Dec. 28, 2023

(51) Int. Cl.
 *G06F 21/44*     (2013.01)
 *G06N 3/08*      (2023.01)

(52) U.S. Cl.
 CPC ............... *G06F 21/44* (2013.01); *G06N 3/08* (2013.01)

(58) Field of Classification Search
 CPC .................................. G06F 21/44; G06N 3/08
 See application file for complete search history.

(56) References Cited

U.S. PATENT DOCUMENTS

| | | | | |
|---|---|---|---|---|
| 9,164,925 B2* | 10/2015 | Mo | ............... | G06F 21/572 |
| 9,240,881 B2* | 1/2016 | Broustis | ............... | H04L 9/40 |
| 9,762,483 B2* | 9/2017 | Arisoylu | ............... | H04L 45/64 |
| 10,509,596 B2* | 12/2019 | Yudanov | ............... | G06F 3/0679 |
| 2007/0290715 A1* | 12/2007 | Baer | ............... | G06F 21/71 326/38 |
| 2014/0245384 A1* | 8/2014 | Shieh | ............... | H04L 9/0894 726/2 |
| 2015/0215424 A1* | 7/2015 | Chun | ............... | H04L 67/60 709/217 |
| 2016/0172017 A1* | 6/2016 | King | ............... | G11C 7/22 365/189.11 |
| 2016/0210260 A1* | 7/2016 | Case | ............... | G06F 9/5011 |
| 2022/0164071 A1* | 5/2022 | Choi | ............... | G06F 3/0481 |
| 2022/0164421 A1* | 5/2022 | Gruhlke | ............... | H04L 63/08 |
| 2024/0054641 A1* | 2/2024 | Chen | ............... | G16H 30/40 |

* cited by examiner

*Primary Examiner* — Vance M Little
(74) *Attorney, Agent, or Firm* — Holland & Hart LLP

(57) ABSTRACT

Methods, systems, and devices for deep learning access and authentication in a computing architecture are described. A computing system a processor, a deep learning device, and a memory system. The deep learning device may be operable to perform operations associated with the processor using a neural network. The memory system enable or disable access to the deep learning device by the processor. For example, the memory system may verify whether the processor is authorized to access the deep learning device and enable or disable access based on the verification. If access is enabled, the deep learning device may perform the one or more operations associated with the processor. If access is disabled, the deep learning device may be restricted from performing the one or more operations associated with the processor.

18 Claims, 7 Drawing Sheets

DEEP LEARNING ACCESS AND AUTHENTICATION IN A COMPUTING ARCHITECTURE

FIELD OF TECHNOLOGY

The following relates to one or more systems for memory, including deep learning access and authentication in a computing architecture.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
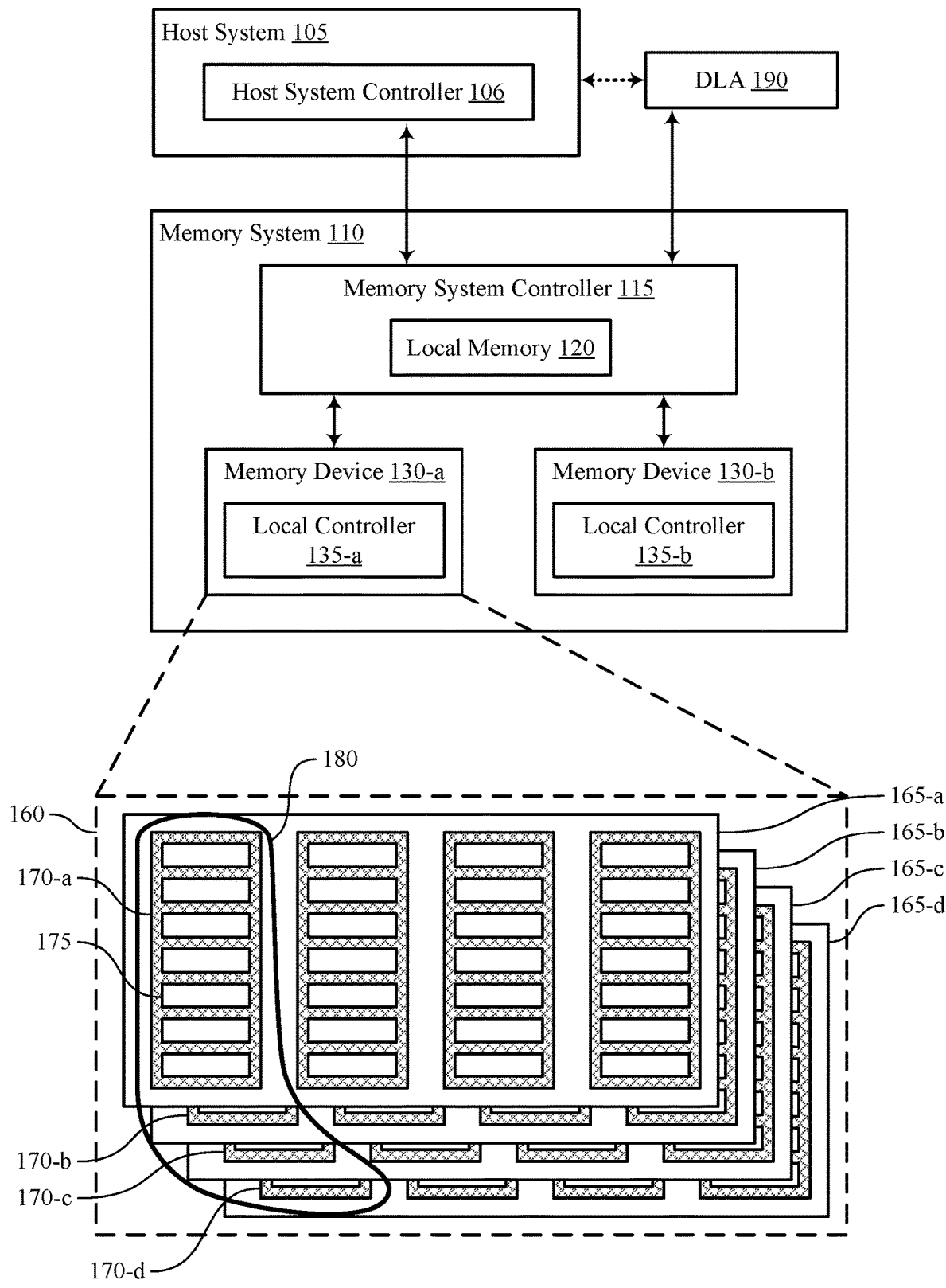
FIGS. 1, 2, and 3 illustrate examples of systems that supports deep learning access and authentication in a computing architecture in accordance with examples as disclosed herein.

Some systems, such as a vehicle system, may implement devices or computing components that interact with the vehicle system or an environment associated with the vehicle system. For example, a vehicle may include devices or computing devices which include sensors for measuring physical properties associated with the vehicle or an environment of the vehicle and actuators configured to control various vehicle systems or subsystems. Additionally, a vehicle may implement a zonal computing architecture to manage the various devices that may be incorporated into the vehicle, for example, at manufacturing or integrated at later times. For example, a vehicle may include a zonal computing system in which different groups of devices are separated into different zones of the vehicle. Each zone may include one or more gateway processors that are configured to route communications between the devices of the zone and one or more central processors of the zonal computing system.

In some systems, such as vehicle systems, machine learning devices, such as deep learning accelerators (DLAs) may be implemented to provide advantages over general-purpose computers. For example, a DLA may enable tasks, which may include machine vision, voice recognition, and natural language processing, among other tasks, to be carried out more rapidly while using less power compared to if a general-purpose computer were to perform such tasks, for example, by implementing one or more neural networks trained to perform such tasks. In some cases, computing architectures, such as a zonal computing architecture of a vehicle, may include one or more DLAs for improved services. Some DLA service providers may want to provide DLA functionality as a subscription-based service, for example, to create an additional stream of revenue for the DLA service provider. However, in some cases, once implemented in a computing architecture, a DLA may be accessed and used to perform supported tasks without restriction. Thus, enabling and disabling the DLA functionality of an existing DLA device included in a computing architecture (e.g., an installed DLA device), for example, based on subscription access may be unsupported.

Techniques, systems, and devices are described herein for including a memory system with authentication capabilities into a computing architecture that may enable or disable access to one or more DLAs included in the computing architecture. For example, a computing system, such as a zonal computing system, may include a processor (e.g., a central processor, a gateway processor), the memory system, and a DLA coupled with the memory system and the processor. The memory system may be operable to verify (e.g., authenticate) whether the processor may access and communicate with the DLA, for example, to facilitate the performance of one or more operations of the processor using one or more neural networks of the DLA. Based on the verification, the memory system may enable or disable communications between the DLA and the processor. In some examples, the verification may be subscription-based. For example, the processor (e.g., a user of the processor) may subscribe to a DLA service and the memory system may enable communications between the processor and the DLA. In other cases, the processor may be unsubscribed from the DLA service and the memory system may block or disable communications between the processor and the DLA. Subscriptions may be changed over time and the memory system may enable or disable communications with the DLA accordingly. As such, the memory system may support DLA functionality as a service, for example, by dynamically enabling or disabling access to a DLA in accordance with subscription access (e.g., post-installation of the DLA into the computing system).

Figure 2:
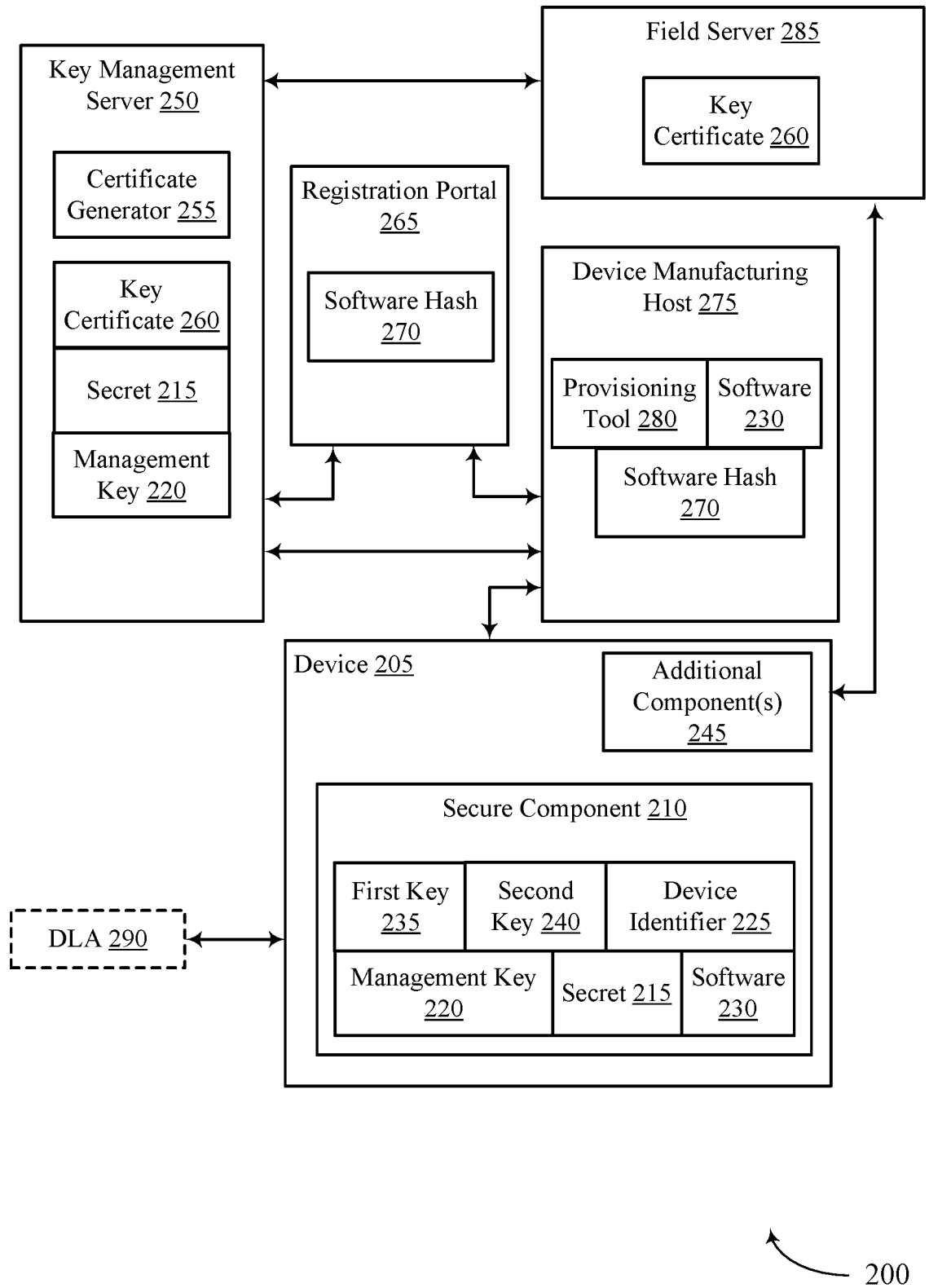
Figure 3:
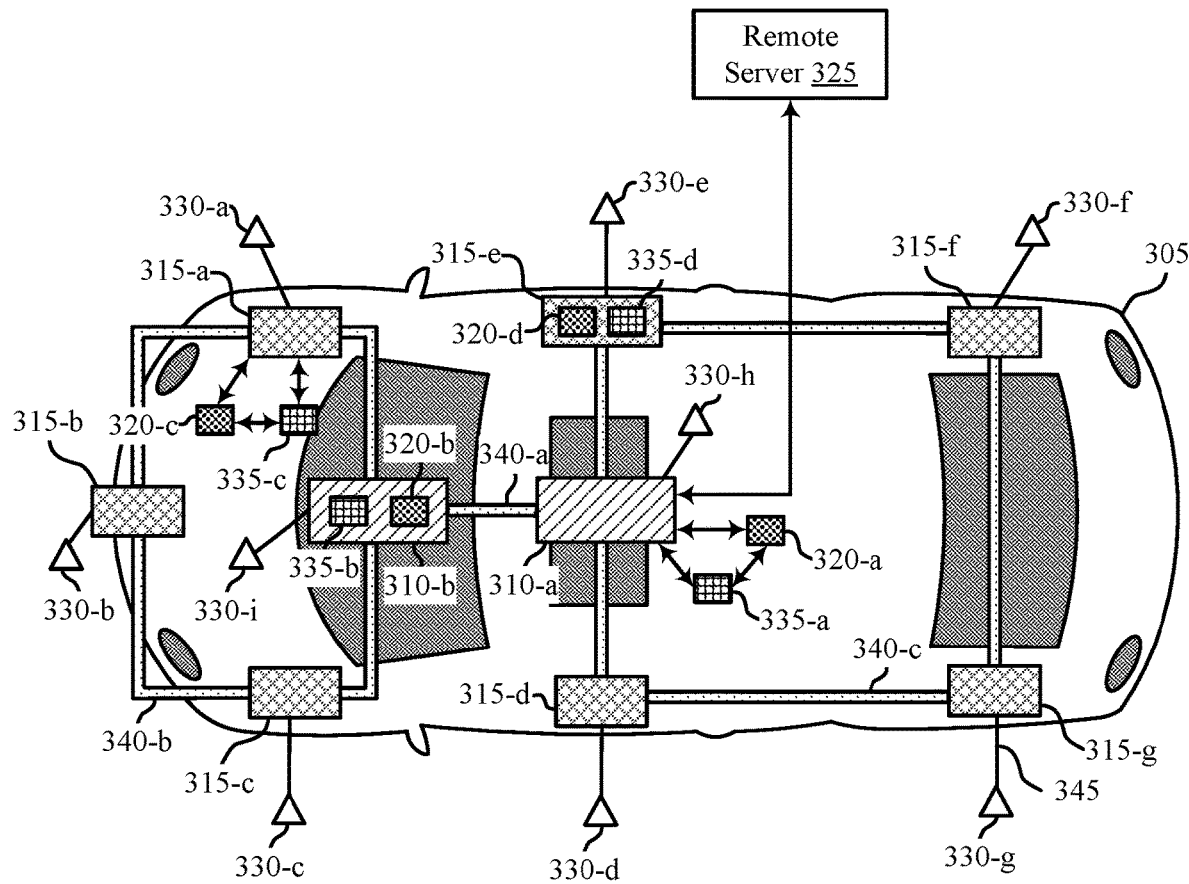

Features of the disclosure are initially described in the context of systems with reference to FIGS. 1 through 3. Features of the disclosure are described in the context of device configurations with reference to FIGS. 4A, 4B, 4C, and 4D. These and other features of the disclosure are further illustrated by and described in the context of an apparatus diagram and flowchart that relate to deep learning access and authentication in a computing architecture with reference to FIGS. 5 through 6.

FIG. 1 illustrates an example of a system 100 that supports deep learning access and authentication in a computing architecture in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open not-and (NAND) Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support deep learning access and authentication in a computing architecture. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system 110 may be incorporated into (e.g., included in, added to) a zonal computing system of a vehicle, for example, to verify whether devices of the zonal computing system are trusted devices. For example, the zonal computing system may include devices, such as sensors or actuators, that are configured to interact with the vehicle or the environment associated with the vehicle. Additionally, the zonal computing system may include one or more central processors configured to communicate information with the devices and manage some operations of the vehicle based on the communicated information. The information may be routed through one or more gateway processors of the zonal computing system. In some examples, the host system 105 may be included in the zonal computing system of the vehicle. For instance, the host system 105 may be an example of a central processor of the zonal computing system, a gateway processor of the zonal computing system, or a device of the zonal computing system.

The system 100 may include one or more DLAs 190, which may be coupled with the memory system 110, the host system 105, or a combination thereof. A DLA 190 may be an example of a deep learning device uses one or more neural networks to perform various operations. For example, the DLA 190 may include one or more neural networks that are trained to perform various inference tasks, such as data analytics, machine vision, voice recognition, and natural language processing, among other tasks for which neural networks may be trained. In some examples, the DLA 190 may include a processor chipset and a software stack executed by the processor chipset. The processor chipset may include one or more cores, one or more caches (e.g., memory local to or included in the DLA 190), and a storage protocol controller (e.g., PCIe controller), among other components. In some cases, the DLA 190 may be a field programmable gate array (FPGA) based device, such as a modular FPGA-based architecture that implements an inference engine that may be tuned for various neural networks. In some examples, the DLA 190 may operate multiple neural networks concurrently. In some examples, a neural network may be implemented on a single DLA 190 or across multiple DLAs 190. The DLA 190 may be trained to perform or support one or more operations of the host system 105 using one or more neural networks.

In accordance with examples described herein, the memory system 110 may be configured to perform an authentication procedure that verifies whether a device (e.g., system, processor) is authorized to access and utilize the DLA 190. For example, the memory system 110 may enable or disable communications between the DLA 190 and the host system 105 based on verifying whether the host system 105 is permitted to access and communicate with the DLA 190. In some examples, the verification may be subscription-based. For example, if the memory system 110 determines that the host system 105 is subscribed to a DLA service, the memory system 110 may enable communications between the host system 105 and the DLA 190. Based on the communications being enabled, the DLA 190 may assist the host system 105 in performing one or more tasks (e.g., operations) using one or more neural networks trained to perform such tasks. Alternatively, if the memory system 110 determines that the host system 105 is unsubscribed from the DLA service, the memory system 110 may disable (e.g., block, restrict) access to the DLA 190. In this way, the memory system 110 may authenticate access to the DLA 190 to provide a way to dynamically enable or disable DLA services, for example, based on the subscription status.

It is noted that, in some examples, the techniques described herein are described with reference to the memory system 110 being a NAND memory system, however, the techniques described herein may be adapted and applied to support such techniques within any type of memory system (e.g., a DRAM system, an FeRAM system, a PCM system, etc.).

FIG. 2 illustrates an example of a system 200 that supports deep learning access and authentication in a computing architecture in accordance with examples as disclosed herein. The system 200 may be an example of a system 100 as described with reference to FIG. 1 or aspects thereof. The system 200 may include a device 205, a key management server 250, a registration portal 265, a device manufacturing host 275, and a field server 285. The device 205 may be an example of a memory system that includes security and authentication capabilities.

The device 205 may include a secure component 210 that is configured to securely store at least a secret 215. The secret 215 may be an example of a unique device secret (UDS). In some cases, the secure component 210 may store a management key 220. The management key 220 may be an example of a server root key (SRK). The server root key may allow an entity in possession of a copy of the management key 220 to manage the secure component 210 by turning on a security feature of the secure component 210. The device 205 may include one or more components associated with a memory device that are operable to perform one or more authentication procedures for the entire device 205. The device 205 may be an example of a vehicle, a component of a zonal computing system of a vehicle, an infotainment system of a vehicle, a personal computer, a portable electronic device, a server, or any other type of computing device.

The secure component 210 may include a device identifier 225 generated according to a device identifier composition engine (DICE) standard. In some cases, the device identifier 225 may be based on the secret 215 and software 230. The device identifier 225 may be used to generate asymmetric key pairs, such as a first key pair 235 and a second key pair 240. The first key pair 235 may be an example of an alias key pair, and the second key pair 240 may be an example of a device identification key pair. In some examples, the device 205 may include one or more additional component(s) 245 that are connected to the secure component 210 to provide the functionality of the device 205 in connection with the software 230.

In some examples, a set of commands may be executed in the device 205 to generate the device identifier 225 from the secret 215 and from a cryptographic software hash 270. In such cases, the device 205 may be in communication with the device manufacturing host 275. The device manufacturing host 275 may include a provisioning tool 280, the software 230, and the software hash 270. The execution of the set of commands may further generate the asymmetric key pair, such as the first key pair 235 and the second key pair 240.

The system 200 may include a key management server 250 that is in communication with the device manufacturing host 275. The key management server 250 may include a certificate generator 255. The certificate generator 255 may be configured to emulate a feature of the device 205 in generating the asymmetric key pairs. For example, the certificate generator 255 may be configured to use the same set of commands executed in the device 205 to generate the device identifier 225 from a copy of the secret 215 stored in the key management server 250 and from the software hash 270 received from a registration portal 265. In such cases, the registration portal 265 may be in communication with the device manufacturing host 275 and the key management server 250.

The set of commands executed in the certificate generator 255 may generate the asymmetric key pair (e.g., the first key pair 235 and the second key pair 240). For example, the software hash 270 and the secret 215 may be combined to create a key. In some examples, the certificate generator 255 may generate a certificate (e.g., key certificate 260) based on the key. For example, the certificate generator 255 may digitally sign a certificate (e.g., a key certificate 260) for a public key in the corresponding asymmetric key pair using a private key of the certificate generator 255 or the key management server 250. The authenticity of the key certificate 260 may be verified via a public key of the certificate generator 255.

In some cases, the key management server 250 may provide the key certificate 260 of the device 205 to the field server 285, thereby enabling the field server 285 to authenticate the device 205 based on the public key certified by the certificate generator 255 and messages (e.g., certificates) signed by the device 205 using its corresponding private key. In such cases, the field server 285 may validate the authenticity of the public key having the certificate signed by the certificate generator 255.

Once a public key of the device 205 is certified, the device 205 may use the corresponding private key to authenticate itself to the field server 285. In such cases, the device 205 may communicate directly with the field server 285. In some examples, the device 205 may digitally sign a message using the private key. If the public key that is associated with a private key of the device 205 is used to verify the digital signature of the certificate, the device 205 may be considered to have possession of the private key. In other examples, the device 205 may be considered to have the identity specified in the certificate signed by the public key. In such cases, the system 200 allows the device 205 to be loaded with software at a time and location different from the implementation of the secrets in the secure component 210 (e.g., management key 220 and secret 215). The system 200 may also allow the device 205 to connect to a service based on a valid public key.

The field server 285 may include multiple, different services for the device 205. In some cases, the different services depend on the device state. For example, when the device 205 is registered through the registration portal 265, one or more software hashes 270 may be uploaded. Each software hash 270 may represent a valid version of the device 205. In some cases, the device 205 may go through a supply chain that may include multiple steps, where each step may represent a different version of software 230. The field server 285 may request what step the device is at in the supply chain in order to be notified of the version of software 230.

The device 205 may be registered by uploading every software hash 270 (e.g., indicating each step in the supply chain) to the registration portal 265. The certificate generator 255 may generate a certificate for each software hash 270. In such cases, the key management server 250 may upload each version of the software hash 270 to the field server 285. When the device 205 presents a key to the field server 285, the field server 285 may connect the device 205 to the service associated with the device state (e.g., software hash 270).

In some examples, the device 205 may modify a list of software hashes 270 uploaded to the registration portal 265. For example, the device 205 may request to add or remove a software hash 270 from the list of software hashes 270. In some examples, the device 205 may communicate the request to add or remove the software hash 270 directly to the key management server 250 rather than communicating with the key management server 250 via the registration portal 265. The certificate generator 255 may regenerate a certificate based on if they software hash 270 is removed or added.

In some examples, the field server 285 may include one or more key certificates 260. When the field server 285 receives a key from the device 205, the field server 285 may compare each of the key certificates 260 in the field server 285 to the received key. In other examples, the field server 285 may identify a key certificate 260 for comparison based on the device state. For example, the device 205 may send a notification to the field server 285 of the device state. Based on the device state, the field server 285 may check the certificate that corresponds to the device state.

In some examples, the device 205 may transmit a connection request to the field server 285. The request may include a key and device identifying information (e.g., a device identification (ID)). The field server 285 may match the connection request (e.g., the key) with a key certificate 260. If the key presented is not valid (e.g., does not match the key certificate 260), then the field server 285 may determine that the device 205 is an untrusted device (e.g., includes faulty or malicious software).

The system 200 may illustrate a process to onboard software 230 on the device 205 with a configuration for secure authentication of the device 205 in accessing the field server 285. For example, the secure component 210 may be configured in a factory without any knowledge or access to software 230 that may be subsequently developed and/or installed in the device 205 that uses the secure component 210. When the secure component 210 is in the factory, secrets (e.g., management key 220 and secret 215) of a first root-of-trust may be injected into the secure component 210. A copy of the secrets may be stored into the key management server 250 (e.g., with an identification of the secure component 210) via a secure connection between the factory and the key management server 250.

In some examples, a device manufacturer develops a design of the device 205 that integrates the secure component 210 and additional components 245. The software 230 for operating the device 205 may become available at the facility (e.g., field server 285) of the device manufacturer. In some cases, the provisioning tool 280 may be used to install the software 230 in the secure component 210 and generate information about the software 230. The information about the software 230 may be used in the device 205 to generate the device identifier 225 of the device 205.

The information about the software 230 may be an example of the software hash 270 of the software 230. For example, the software hash 270 may be a cryptographic function of the source code of the software 230. In some cases, the software hash 270 may represent information of a second root-of-trust associated with the device manufacturer. In other examples, the software hash 270 may be digitally signed using a private key of the device manufacturer.

The software hash 270 used for the generation of keys in the device 205 may be communicated to the key management server 250 via a registration portal 265 during the registration of the secure component 210. In some cases, the software hash 270 may be provided to the device 205 as part of an installation process of the software 230 in the device 205. In such examples, the key certificate 260 stored on the field server 285 may be based on the software hash 270 of the original software. Any updates to the software 230 of the device may not be reflected in the key certificate 260 stored by the field server 285. In some examples, the certificate generator 255 may use the software hash 270 to generate a public key of the device 205, independent of the operations of the device 205, and sign the key certificate 260 for the public key of the device 205.

The registration portal 265 may use the management key 220 to manage the secure component 210 and activate the security feature of the secure component 210 after the registration of the secure component 210 and/or after the generation of the key certificate 260. After the security feature of the secure component 210 is activated, the secure component 210 installed in the device 205 may be used in generating the device identifier 225 of the device 205 and cryptographic keys (e.g., the first key pair 235 and the second key pair 240) of the device identifier 225.

The system 200 may support the authentication of a DLA 290 that communicates or is coupled with the device 205 (e.g., physically separate from the device 205 or physically included in the device 205). For example, in some cases, the device 205 may be an example of a processor of a computing system (e.g., a central processor or a gateway processor of a zonal computing system of a vehicle), and the secure component 210 may be an example of a memory system (e.g., a memory system 110) that is capable of authenticating whether the device 205 has access to DLA services. For instance, the secure component 210 may receive information from the device 205 (e.g., a device ID of the device 205, a key, a message signed with a cryptographic key, a hash of code signed with the cryptographic key, and the like) that enables the secure component 210 to verify whether the device 205 is authorized to access the DLA 290 (e.g., based on a subscription status of the device 205). Based on the verification of enabling or disabling DLA services, the secure component 210 may be configured to enable or disable communications between the device 205 and the DLA 290.

FIG. 3 illustrates an example of a system 300 that supports deep learning access and authentication in a computing architecture in accordance with examples as disclosed herein. The system 300 may implement or be implemented by aspects of the systems 100 and 200 described with reference to FIGS. 1 and 2. For example, the system 300 may depict operation of a zonal computing system of a vehicle 305 that includes various components, such as central processors 310, gateway processors 315, memory systems 320, devices 330, and DLAs 335 which may be examples of corresponding devices described with reference to FIGS. 1 and 2. In some cases, devices 330 may include devices such as sensors or actuators for the system 300. Additionally, the system 300 may support the authentication and management of DLA services that may be incorporated into the vehicle 305 to utilize machine learning processes via the DLAs 335 to enable tasks such as machine vision, voice recognition, and natural language processing, among other tasks.

The vehicle 305 may implement a zonal computing system to manage various devices that may be included in the vehicle 305. For example, the vehicle 305 may include a zonal computing system in which different groups of components of the vehicle 305 are divided into various zones and managed in accordance with the zones. The zonal computing system may include one or more central processors 310 that are configured to communicate with a remote server 325. For example, the zonal computing system may include a central processor 310-*a* and a central processor 310-*b* that may each be configured to communicate with the remote server 325. The remote server 325 may be configured to perform authentication services for various components of the zonal computing system. For example, the remote server 325 may be an example of, or perform one or more operations of, a field server 285 or a key management server 250 described with reference to FIG. 2. In some examples, the remote server 325 may provide the vehicle 305 access to a network, and the vehicle 305 may receive data from the network via the remote server 325. In some examples, the remote server 325 may be an example of a cloud server. The central processors 310 may communicate with the remote server 325 wirelessly, for example, using one or more antennas of the vehicle 305 in accordance with one or more radio access technologies.

The central processors 310 may additionally be configured to communicate with various zones of the zonal computing system. For example, the zonal computing system may include: gateway processors 315; and devices 330, which may include actuators that are configured to control (e.g., trigger, cause, or perform actions with) a subsystem of the vehicle 305 or sensors that are configured to measure a physical property associated with the vehicle 305 or an environment associated with the vehicle 305 (e.g., a motion sensor, a camera, a radar sensor, a speedometer, a gas meter, a fuel temperature sensor, an oxygen sensor, a light detection and ranging (LiDAR) sensor, or some other sensor that may be included in the vehicle 305); among other computing components that may be included in the zonal computing system. Each of the gateway processors 315 and devices 330 may be associated with a respective zone of the zonal computing system. The gateway processors 315 may be coupled with at least one of the central processors 310 (e.g., directly or via one or more other gateway processors 315) and with one or more devices 330, or a combination thereof. Additionally, the gateway processors 315 may be configured to route communications between the at least one central processor 310 and the respective devices 330 with which the gateway processors 315 are coupled. Accordingly, the central processors 310 may be configured to communicate with devices 330 of a zone via one or more gateway processors 315 associated with the zone. In some examples, a zone may include a communication path coupled with one or more gateway processors 315.

In the example of FIG. 3, the zonal computing system may include a gateway processor 315-a, a gateway processor 315-b, a gateway processor 315-c, a gateway processor 315-d, a gateway processor 315-e, a gateway processor 315-f, and a gateway processor 315-g, although any quantity of gateway processors 315 may be included in the zonal computing system of the vehicle 305. In some examples, each gateway processor 315 may be associated with a different zone of the zonal computing system. For example, the gateway processor 315-a may be associated with a first zone of the zonal computing system, the gateway processor 315-b may be associated with a second zone of the zonal computing system, the gateway processor 315-c may be associated with a third zone of the zonal computing system, and so on. In other examples, multiple gateway processors 315 may be associated a single zone of the zonal computing system. For example, the gateway processor 315-a, the gateway processor 315-b, and the gateway processors 315-c may be associated with the first zone; the gateway processor 315-d and the gateway processor 315-e may be associated with the second zone, and the gateway processor 315-f and the gateway processor 315-g may be associated with the third zone. In some examples, the central processors 310 may be coupled with one or more device 300. For example, the central processor 310-a may be coupled with a device 330-h, and the central processor 310-b may be coupled with a device 330-i. In some examples, the device 330-h and 330-i may be associated with different zones of the zonal computing system or with one of the zones with which the central processors 310 are configured to communicate (e.g., one of the zones associated with a gateway processor 315).

The devices 330 included in the vehicle 305 may be associated with the respective zones of the gateway processors 315 with which they are coupled. For example, in the example of FIG. 3, the gateway processor 315-a may be coupled with a device 330-a, the gateway processor 315-b may be coupled with a device 330-b, the gateway processor 315-c may be coupled with a device 330-c, the gateway processor 315-d may be coupled with a device 330-d, the gateway processor 315-e may be coupled with a device 330-e, the gateway processor 315-f may be coupled with a device 330-f, and the gateway processor 315-g may be coupled with a device 330-g. Each of the devices 330-a through 330-g may be associated with (e.g., included in) the zone with which the corresponding gateway processor 315 is associated (e.g., the first zone through a seventh zone, respectively).

The components of the zonal computing system may communicate according to various communication protocols. For example, the central processors 310 and the gateway processors 315 may be coupled over various signal buses 340 that operate according to a first communication protocol. For instance, the central processor 310-a and the central processor 310-b may communicate over a signal bus 340-a. The central processor 310-b may communicate with the gateway processor 315-a, the gateway processor 315-b, and the gateway processor 315-c over a signal bus 340-b. The central processor 310-a may communicate with the gateway processor 315-d, the gateway processor 315-e, the gateway processor 315-f, and the gateway processor 315-g over a signal bus 340-c. In some examples, the central processors 310 may communicate with the gateway processors 315 directly or indirectly over the signal buses 340. For example, the central processor 310-b may be directly coupled with the gateway processor 315-a and the gateway processor 315-c over the signal bus 340-b and indirectly coupled with the gateway processor 315-b over the signal bus 340-b via the gateway processor 315-a, the gateway processor 315-c, or both. Thus, communications between the central processor 310-b and the gateway processor 315-b may be routed through the gateway processor 315-a, the gateway processor 315-c, or both. Additionally, the central processor 310-a may be directly coupled with the gateway processor 315-d and the gateway processor 315-e over the signal bus 340-c and indirectly coupled with the gateway processor 315-f and the gateway processor 315-g over the signal bus 340-c. In some examples, the signal buses 340 may be examples of ethernet cables and the first communication protocol may be an ethernet communication protocol according to which the central processors 310 and the gateway processors 315 may communicate.

Additionally, the devices 330 may be coupled with respective gateway processors 315 or central processors 310 over various signal buses 345 that operate according to one or more different communication protocols. In some examples, the one or more different communication protocols may be lower capacity or bandwidth communication protocols with respect to the first communication protocol, such as a serial communication protocol. The gateway processors 315 may be configured to translate information between the first communication protocol (e.g., used to communicate information between the gateway processors 315 and the central processors 310) and the one or more different communication protocols (e.g., used between the gateway processors 315 and the devices 330). For example, the gateway processor 315-a may translate information that is communicated from the central processor 310-b to the device 330-a from the first communication protocol to a second communication protocol. Additionally, the gateway processor 315-a may translate information that is communicated from the device 330-a to the central processor 310-b from the second communication protocol to the first communication protocol. As such, the central processors 310 may communicate information with the devices 330 to control various operations and functions of the vehicle 305 (e.g., such as operations related to autonomous driving, alert notifications, etc.).

The zonal computing system of the vehicle 305 may include one or more DLAs 335 configured to perform operations of the components of the zonal computing system by utilizing one or more neural networks. In some cases, the use of neural networks may help to reduce power consumption and reduce latency, among other performance operations. The DLAs 335 may include machine learning processes and other advanced computing techniques that may be utilized by the components of the zonal computing system. For example, a processor of the vehicle 305 (e.g., a central processor 310, a gateway processor 315) may transmit information to a DLA 335, which the DLA 335 may use as input into one or more neural networks. The DLA 335 may transmit responsive information to the processor that is output by the one or more neural networks based on the information received from the processor. For instance, the processor may transmit information gathered from one or more devices 330 to the DLA 335, and the DLA 335 may input the information into one or more neural networks, for example, for the purposes of supporting data analytics or autonomous driving, among other operations of the vehicle 305 supported by the processor. The DLA 335 may transmit outputs of the one or neural networks to the processor, which the processor may use in performing, for example, the data analytics, autonomous driving, etc.

A DLA 335 may be included in (e.g., embedded in) or coupled with a central processor 310 or a gateway processor 315. For example, in the example of FIG. 3, the central processor 310-a may be coupled with a DLA 335-a, the central processor 310-b may include (e.g., be embedded with) a DLA 335-b, the gateway processor 315-a may be coupled with a DLA 335-c, the gateway processor 315-e may include a DLA 335-d, or a combination thereof. It is noted, however, that FIG. 3 depicts an example configuration of DLAs 335 within the vehicle 305 and that any combination of components of the zonal computing system may include or be coupled with a respective DLA 335.

In some cases, dynamic disabling or enabling of communications between the DLA 335 and the processor may be desired. For example, a DLA service provider (e.g., a manufacturer of a DLA 335) may desire to provide DLA services to the vehicle 305 as an optional service (e.g., paid service) to which the vehicle 305 (e.g., a user of the vehicle 305) may subscribe or unsubscribe at will. However, in some cases, once implemented (e.g., installed) in the vehicle 305, a DLA 335 may be accessed by components of the zonal computing system without restriction. Thus, dynamically opting into or out of DLA services provided by an installed DLA 335 may be unsupported.

The zonal computing system of the vehicle 305 may include one or more memory systems 320 that are capable of authenticating (e.g., verifying, determining, identifying) whether a component of the zonal computing system is authorized to access (e.g., communicate with) a DLA 335 at any given time. Such memory systems 320 may ensure that each processor (e.g., central processor 310, gateway processor 315) that is allowed (e.g., enabled) to communicate with a DLA 335 is authorized to access the DLA 335, for example, based on a subscription of the processor to a DLA service, thereby supporting DLA service accessibility to be adjusted over time (e.g., post-installation of a DLA 335).

A memory system 320 may be included in (e.g., embedded in) or coupled with a central processor 310 or a gateway processor 315 and coupled with a DLA 335. For example, in the example of FIG. 3, a memory system 320-a may be coupled with the central processor 310-a and the DLA 335-a, a memory system 320-b may be included (e.g., embedded) in the central processor 310-b and coupled with the DLA 335-b, a memory system 320-c may be coupled with the gateway processor 315-a and the DLA 335-c, a memory system 320-d may be included in the gateway processor 315-e and coupled with the DLA 335-d, or a combination thereof. It is noted, however, that FIG. 3 depicts an example configuration of memory systems 320 within the vehicle 305 and that any combination of components of the zonal computing system may include or be coupled with a respective memory system 320.

The memory systems 320 may unlock (e.g., enable, unblock, permit) or lock (e.g., disable, block, restrict) access to the DLAs 335 by other components of the zonal computing system (e.g., the central processors 310 or the gateway processors 315) to aid in performing various operations.

For example, the memory systems 320 may be configured to perform an authentication procedure to verify whether a processor is authorized to access a DLA 335 coupled with the processor. Based on the authentication procedure, a memory system 320 may enable or disable communications between the DLA 335 and the processor. For example, the memory system 320-a may perform an authentication procedure to determine (e.g., verify) whether the central processor 310-a is authorized to access the DLA 335-a. If the memory system 320-a determines that the central processor 310-a is authorized based on (e.g., as a result of) the authentication procedure, the memory system 320-a may enable communications between the central processor 310-a and the DLA 335-a (e.g., enable access to the DLA 335-a by the central processor 310-a) such that the DLA 335-a may perform one or more operations associated with the central processor 310-a (e.g., based on information provided by the central processor 310-a). Alternatively, if the memory system 320-a determines that the central processor 310-a is unauthorized to access the DLA 335-a based on (e.g., as a result of) the authentication procedure, the memory system 320-a may disable the communications between the central processor 310-a and the DLA 335-a (e.g., disable access to the DLA 335-a by the central processor 310-a) such that the DLA 335-a may be restricted from performing the one or more operations associated with the central processor 310-a (e.g., based on being restricted from receiving information from the central processor 310-a).

As part of an authentication procedure, a memory system 320 may receive first identification information from the processor. In some examples, the memory system 320 may receive the first identification information via a gateway processor 315, a central processor 310, or both. For example, the memory system 320-a may receive identification information central processor 310-a. Additionally or alternatively, if the memory system 320-a is configured to verify whether the gateway processor 315-a is authorized to access the DLA 335-c, the memory system 320-a may receive the identification information from the gateway processor 315-a via the central processor 310-b and 310-a. That is, identification information may be routed to a memory system 320 via one or more central processors 310, gateway processors 315, or both, such that the authentication procedure may be performed.

The first identification information may enable the memory system 320 to determine whether the processor is authorized to access a DLA 335. For example, the first identification information may include an ID of the processor, a key, a message signed with a cryptographic key, a hash of code signed with the cryptographic key, or some other information that enables the memory system 320 to verify whether the processor is authorized to access the DLA 335. In some examples, to verify the processor using the first identification information, the memory system 320 may compare the first identification information with second identification information stored at the memory system 320. For example, as part of the authentication procedure, the memory system 320 may compare the first identification information with the second identification information to determine whether the first identification information and the second identification information match. If the memory system 320 determines that the first identification information and the second identification information match (e.g., or in some other way correspond to each other), the memory system 320 may determine that the processor is authorized to access the DLA 335 and enable communications between the processor and the DLA 335. Alternatively, if the memory system 320 determines that the first identification information and the second identification information are different based on the comparison (e.g., do not match or in some other way do not correspond to each other), the memory system 320 may determine that the processor is unauthorized to access the DLA 335 and may disable the communications between the processor and the DLA 335.

In some instances, the memory systems 320 may unlock or lock access to DLAs 335 based on a subscription to a deep learning service (e.g., a DLA service). For example, a DLA service provider associated with the DLAs 335 may offer DLA services provided by the DLAs 335 to the components of the zonal computing system as part of a subscription-based service. As part of an authentication procedure, a memory system 320 may determine whether a processor (e.g., a user of the processor, a user of the vehicle 305) is subscribed to the DLA service. If the processor is subscribed to the DLA service, the memory system 320 may enable access to the DLA 335 by the processor (e.g., enable communications between the DLA 335 and the processor). Alternatively, if the processor is unsubscribed from the DLA service, the memory system 320 may disable access to the DLA 335 by the processor (e.g., disable communications between the DLA 335 by the processor). In some examples, the memory system 320 may verify whether the processor is subscribed to the DLA service based on comparing identification information received from the processor to identification information stored at the memory system 320. For example, if there is a match between the respective identification information, the memory system 320 may determine that the processor is subscribed to the DLA service.

In some examples, the memory systems 320 may support enabling various types of access to the DLAs 335 by a processor. For example, the DLA service provider may offer different subscription types (e.g., subscription tiers) that correspond to different operations that the DLAs 335 may perform. For instance, the DLAs 335 may support performing a set of operations, and different subscription types may be associated different subsets of operations that a DLA 335 may be enabled to perform. Higher subscription tiers (e.g., corresponding to higher subscription costs) may be associated with relatively more operations or more complex operations that may be performed by the DLAs 335 compared to lower subscription tiers. For example, a first subscription type may correspond to unrestricted access to a DLA 335 by a processor, and a second subscription type may correspond to a subset of operations being enabled to be performed by the DLA 335.

The memory system 320 may determine a subscription type of the processor (e.g., based on comparing respective identification information) and enable a type of access to the DLA 335 based on the subscription type. For example, if the processor has the first subscription type, the memory system 320 may enable a first type of access to the DLA 335 corresponding to unrestricted access to the DLA 335 such that the DLA 335 may be enabled to perform any of the supported operations. Alternatively, if the processor has the second subscription type, the memory system 320 may enable a second type of access to the DLA 335 that supports the subset of operations to be performed by the DLA 335.

The memory systems 320 may be configured to periodically perform authentication procedures to verify trust (e.g., device trust, software trust, firmware trust, and the like). For example, a memory system 320 may be configured to perform an authentication procedure based on a triggering event, such as a power-on procedure. For instance, the memory system 320 may be configured to perform the authentication procedure in response to a power-on procedure of the vehicle 305, a power-on procedure of the zonal computing system, a power-on procedure of a processor (e.g., a central processor 310, a gateway processor 315), or a combination thereof. In some examples, the memory systems 320 may be periodically authenticated. For example, the memory systems 320 may periodically authenticate themselves via the remote server 325 (e.g., with a key management server 250, with a field server 285). In some examples, the memory systems 320 may be authenticated in response to a triggering event, such as a power-on procedure of the memory systems 320.

By including and implementing the memory systems 320, the zonal computing system may support dynamically enabled or disabled DLA services (e.g., post installation of DLAs 335). It is noted that the zonal computing system of the vehicle 305 is provided as an example computing system in which DLA functionality may be dynamically enabled or disabled by a memory system 320 and that other types of computing systems may implement memory systems 320 and DLAs 335 to support deep learning functionality as a service.

FIGS. 4A, 4B, 4C, and 4D illustrate examples of device configurations 400 that support deep learning access and authentication in a computing architecture in accordance with examples as disclosed herein. The device configurations 400 may implement or be implemented by aspects of the systems 100, 200, and 300 described with reference to FIGS. 1 through 3, respectively. For example, the device configurations 400 may include various authentication device and DLA configurations that support dynamically enabling or disabling access to a DLA device by a processor 430, such as a central processor 310 or a gateway processor 315 described with reference to FIG. 3. In some examples, the device configurations 400 may be implemented by (e.g., included in) a computing system, such as a zonal computing system of a vehicle 305 as described with reference to FIG. 3.

In some computing systems, access to the DLA device may be provided to a processor 430 in accordance with various device configurations 400. For instance, communications between the processor 430 and the DLA device may depend on an arrangement of the authentication and DLA devices. For example, the authentication device and the DLA device may be arranged according to a die stacking configuration, a three-dimensional (3D) system with DLA capabilities configuration, a single memory die configuration, or a system configuration, among other possible configurations.

Figure 4A:
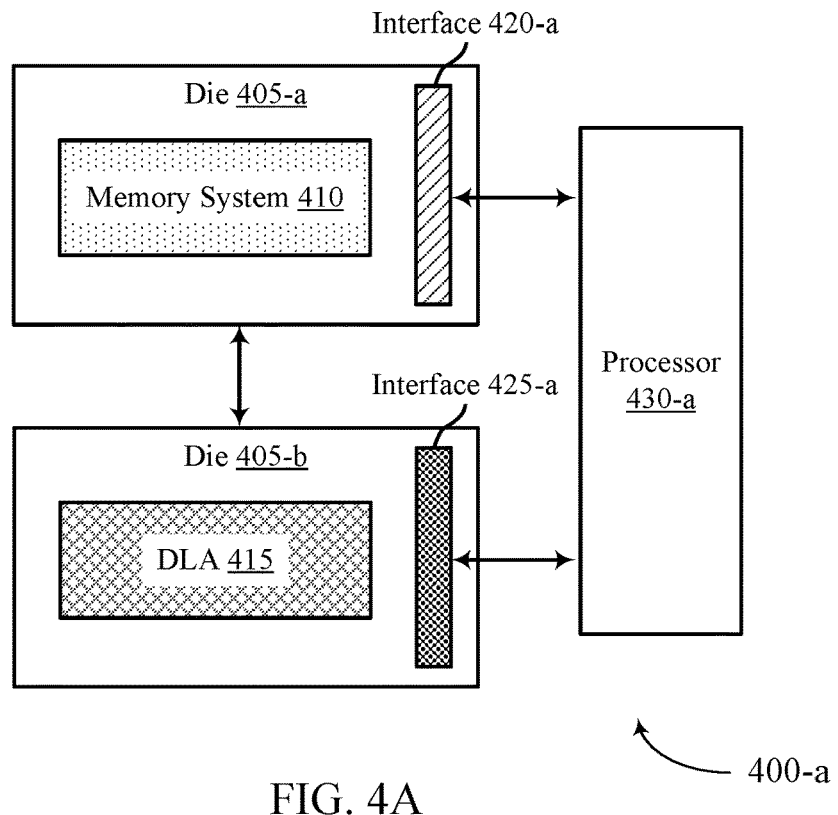
FIGS. 4A, 4B, 4C, 4D illustrate examples of device configurations that supports deep learning access and authentication in a computing architecture in accordance with examples as disclosed herein.

FIG. 4A illustrates a device configuration 400-a, which may be an example of a die stacking configuration according to which an authentication device and DLA device may be configured. For example, the device configuration 400-a may include a die 405-a and a die 405-b which may be physically stacked (e.g., on top of each other, adjacent to each other). The die 405-a may include a memory system 410, which may be an example of a memory system described herein that includes authentication capabilities The die 405-a may also include an interface 420-a (e.g., a chip interface) to couple the die 405-a with a processor 430-a. The memory system 410 may communicate with the processor 430-a via the interface 420-a (e.g., communications between the memory system 410 and processor 430-a may be routed via the interface 420-a).

The die 405-b may include a DLA 415, which may be an example of a DLA described herein that is operable to perform one or more operations associated with the processor 430-*a*. The die 405-*b* may also include an interface 425-*a* (e.g., a DLA interface) to couple the die 405-*b* with the processor 430-*a*. The DLA 415 may communicate with the processor 430-*a* via the interface 425-*a*. Both the die 405-*a* and the die 405-*b* may be coupled together and support communications between components of the dies 405.

The memory system 410 may enable or disable communications between the processor 430-*a* and the DLA 415 based on enabling or disabling the interface 425-*a*. For example, the memory system 410 may verify whether the processor 430-*a* is authorized to access the DLA 415 (e.g., based on communications received via the interface 420-*a*). If the processor 430-*a* is authorized, the memory system 410 may enable the interface 425-*a* such that the processor 430-*a* and the DLA 415 may communicate. If the processor 430-*a* is unauthorized, the memory system 410 may disable the interface 425-*a* such that the processor 430-*a* and the DLA 415 may be unable to communicate.

Figure 4B:
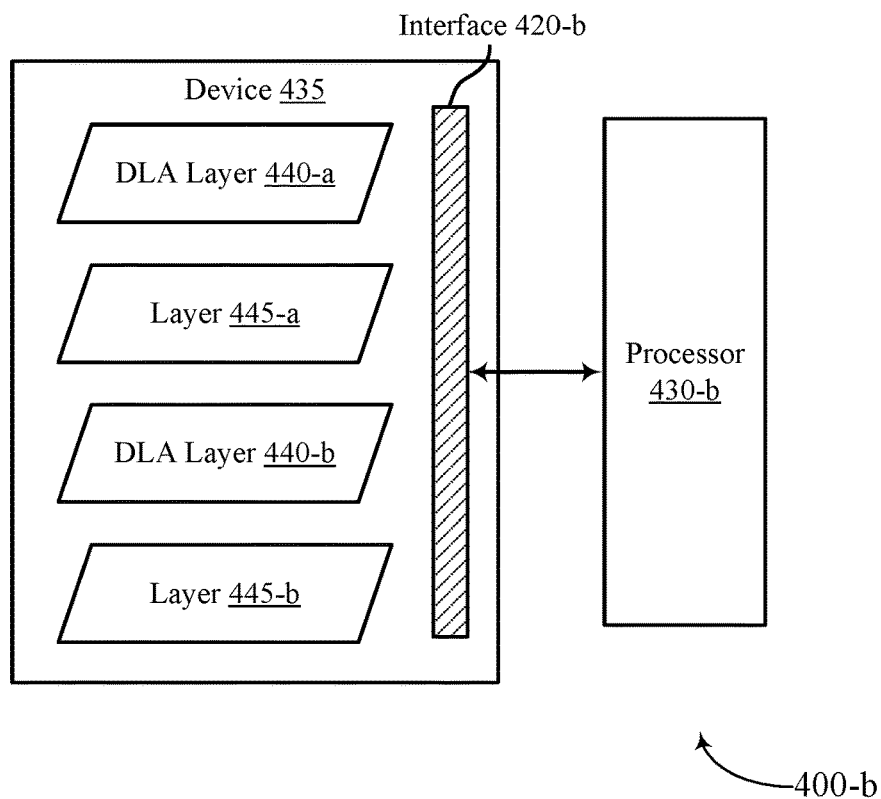

FIG. 4B illustrates a device configuration 400-*b* which may be an example of a 3D system with DLA capabilities configuration according to which an authentication device and DLA device may be configured. For example, a device 435 may be an example of a 3D device with multiple layers (e.g., levels, decks). In some examples, the device 435 may include one or more DLA layers 440 and one or more layers 445 which may be stacked along a direction orthogonal to a substrate over which the layers are located (e.g., a vertical direction). The device 435 may also include an interface 420-*b* (e.g., a chip interface) via which the device 435 may communicate with a processor 430-*b*. A DLA layer 440 (e.g., or a combination of one or more DLA layers 440) may be an example of a DLA that is operable to perform one or more operations associated with a processor 430-*b*. A layer 445 (e.g., or a combination of one or more layers 445) may be an example of a memory system that is operable to verify whether the processor 430-*b* is authorized to access the DLA layers 440.

Figure 4C:
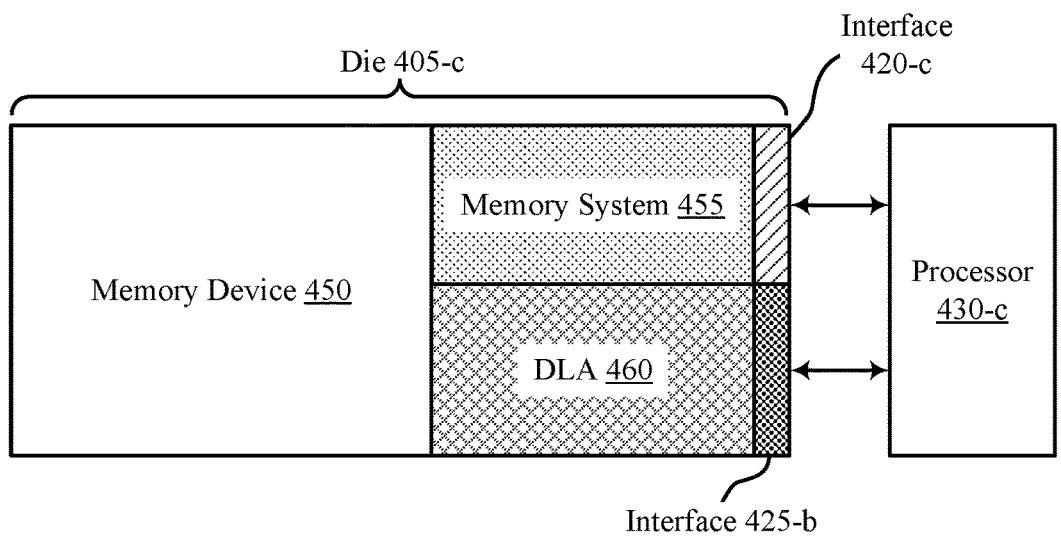

In the example of FIG. 4B, the device 435 may include a DLA layer 440-*a*, a layer 445-*a*, a DLA layer 440-*b*, and a layer 445-*b* (although any quantity of DLA layers 440 and layers 445, respectively, may be included the device 435). The layers 445 may verify whether the processor 430-*b* is authorized to access the DLA layers 440 (e.g., based on communications received via the interface 420-*b*). If the processor 430-*b* is authorized, the layers 445 may enable access to the DLA layers 440 via the interface 420-*b* such that the processor 430-*b* and the DLA layers 440 may communicate. If the processor 430-*b* is unauthorized, the layers 445 may disable access to the DLA layers 440 via the interface 420-*b* such that the processor 430-*b* and the DLA layers 440 may be unable to communicate, FIG. 4C illustrates a device configuration 400-*c* which may be an example of a single memory die configuration according to which an authentication device and DLA device may be configured. For example, the device configuration 400-*c* may include a die 405-*c* and a processor 430-*c*. The die 405-*c* may include a memory device 450 (e.g., a memory device 130) and a memory system 455 that includes authentication capabilities. The die 405-*c* may include an interface 420-*c* (e.g., a chip interface) via which the processor 430-*c* accesses (e.g., communicates with) the memory system 455. The die 405-*c* may further include a DLA 460 and an interface 425-*b* (e.g., a DLA interface) via which the processor 430-*c* accesses the DLA 460. The memory device 450, the memory system 455, and the DLA 460 may be coupled with and communicate with one another on the die 405-*c*.

The memory system 455 may enable or disable communications between the processor 430-*c* and the DLA 460 based on enabling or disabling the interface 425-*b*. For example, the memory system 455 may verify whether the processor 430-*c* is authorized to access the DLA 460 (e.g., based on communications received via the interface 420-*c*). If the processor 430-*c* is authorized, the memory system 455 may enable the interface 425-*b* such that the processor 430-*c* and the DLA 460 may communicate. If the processor 430-*c* is unauthorized, the memory system 455 may disable the interface 425-*b* such that the processor 430-*c* and the DLA 460 may be unable to communicate.

Figure 4D:
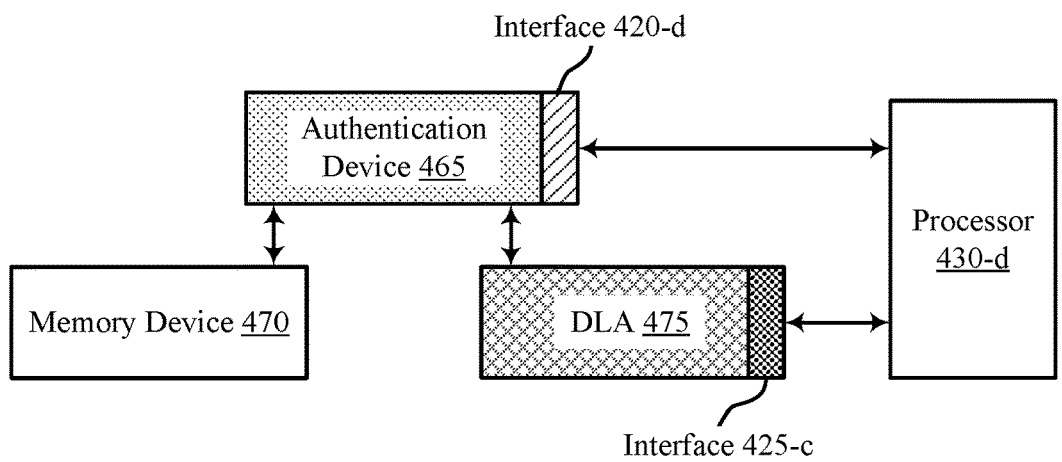

FIG. 4D illustrates a device configuration 400-*d* which may be an example of a system configuration according to which an authentication device and DLA device may be configured. For example, the device configuration 400-*d* may include an authentication device 465 coupled with a separate memory device 470 (e.g., a memory device 130, local memory 120) and a separate DLA 475. In some cases, the authentication device 465 may be a memory device (e.g., a not-or (NOR) memory device, among other types of memory devices) whose sole functionality is to verify whether a processor 430-*d* may access other components of a system, such as the memory device 470 and the DLA 475. The authentication device 465 may include an interface 420-*d* (e.g., a chip interface) via which the processor 430-*d* and the authentication device 465 may communicate. Additionally, the DLA 475 may include an interface 425-*c* (e.g., a DLA interface) via which the processor 430-*d* may access the DLA 475.

The authentication device 465 may enable or disable communications between the processor 430-*d* and the DLA 475 based on enabling or disabling the interface 425-*c*. For example, the authentication device 465 may verify whether the processor 430-*d* is authorized to access the DLA 475 (e.g., based on communications received via the interface 420-*d*). If the processor 430-*d* is authorized, the authentication device 465 may enable the interface 425-*c* such that the processor 430-*d* and the DLA 475 may communicate. If the processor 430-*d* is unauthorized, the authentication device 465 may disable the interface 425-*c* such that the processor 430-*d* and the DLA 475 may be unable to communicate.

Figure 5:
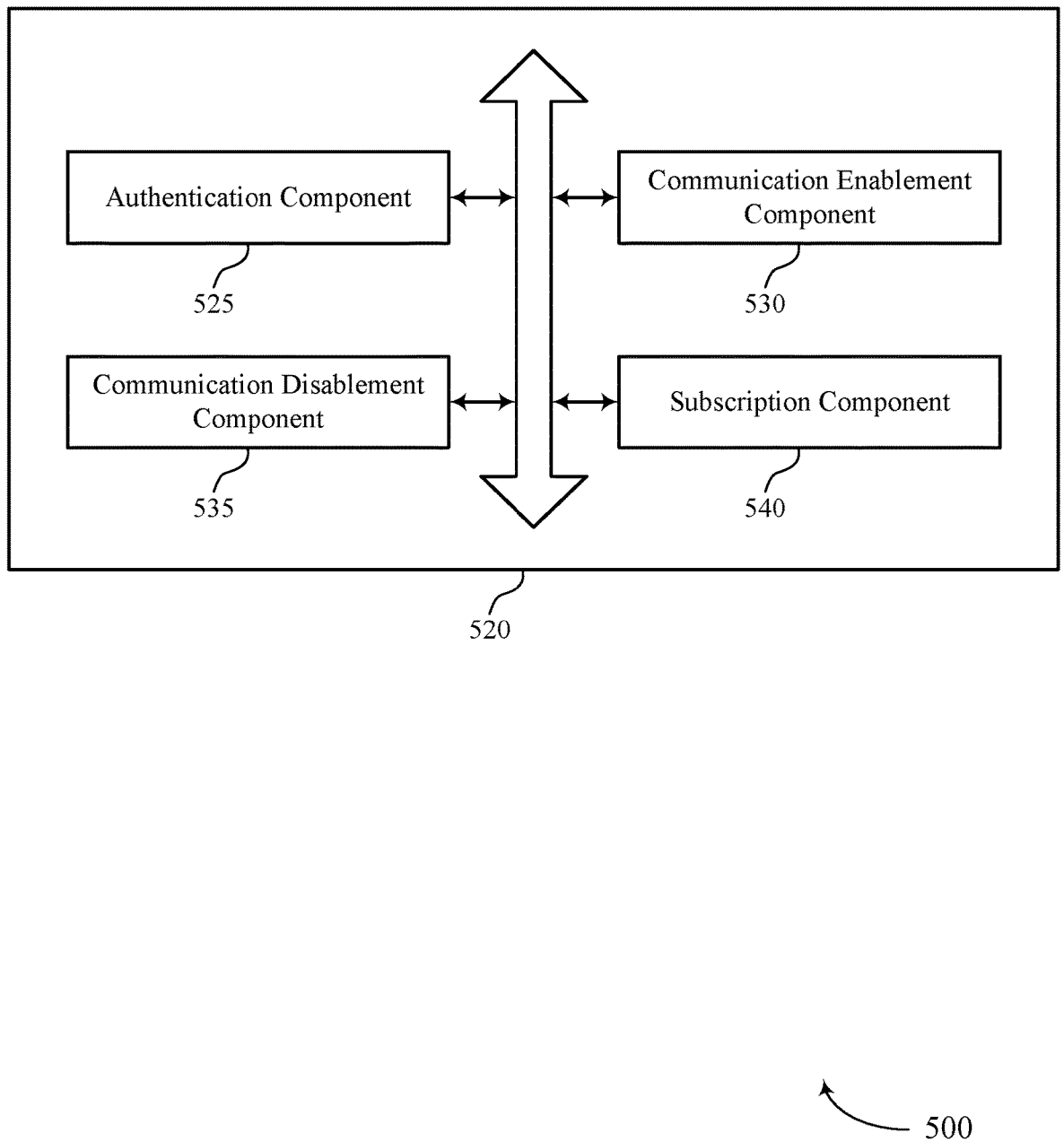
FIG. 5 shows a block diagram of a memory system that supports deep learning access and authentication in a computing architecture in accordance with examples as disclosed herein.

FIG. 5 shows a block diagram 500 that supports deep learning access and authentication in a computing architecture in accordance with examples as disclosed herein. of a memory system 520 that supports deep learning access and authentication in a computing architecture in accordance with examples as disclosed herein. The memory system 520 may be an example of aspects of a memory system as described with reference to FIGS. 1 through 4. The memory system 520, or various components thereof, may be an example of means for performing various aspects of deep learning access and authentication in a computing architecture as described herein. For example, the memory system 520 may include an authentication component 525, a communication enablement component 530, a communication disablement component 535, a subscription component 540, or any combination thereof. Each of these components may communicate, directly or indirectly, with one another (e.g., via one or more buses).

The authentication component 525 may be configured as or otherwise support a means for performing, by a memory system, an authentication procedure to verify whether a processor is authorized to access a deep learning device (e.g., a DLA) that is coupled with the processor and operable to perform one or more operations associated with the processor using a neural network. The communication enablement component 530 may be configured as or otherwise support a means for enabling, by the memory system, communications between the processor and the deep learning device based at least in part on the authentication procedure indicating that the processor is authorized to access the deep learning device.

In some examples, a first die includes the deep learning device and a second die includes the memory system. In some examples, to support enabling the communications between the processor and the deep learning device, the communication enablement component 530 may be configured as or otherwise support a means for enabling an interface of the first die via which the processor accesses the deep learning device.

In some examples, the deep learning device corresponds to one or more first layers and the memory system corresponds to one or more second layers. In some examples, to support enabling the communications between the processor and the deep learning device, the communication enablement component 530 may be configured as or otherwise support a means for enabling access to the one or more first layers corresponding to the deep learning device.

In some examples, a memory die includes the deep learning device and the memory system, the memory die including a first interface via which the processor accesses the memory system and a second interface via which the processor accesses the deep learning device. In some examples, to support enabling the communications between the processor and the deep learning device, the communication enablement component 530 may be configured as or otherwise support a means for enabling the second interface via which the processor accesses the deep learning device.

In some examples, the authentication component 525 may be configured as or otherwise support a means for determining that the processor is authorized to access the deep learning device based at least in part on first identification information from the processor matching second identification information stored at the memory system, where the communications between the processor and the deep learning device are enabled based at least in part on the determination.

In some examples, the authentication component 525 may be configured as or otherwise support a means for determining, after enabling the communications between the processor and the deep learning device, that the processor is unauthorized to access the deep learning device based at least in part on first identification information from the processor being different from second identification information stored at the memory system. In some examples, the communication disablement component 535 may be configured as or otherwise support a means for disabling access to the deep learning device by the processor based at least in part on the determination.

In some examples, the subscription component 540 may be configured as or otherwise support a means for determining that the processor is subscribed to a deep learning service associated with the deep learning device, where the communications between the processor and the deep learning device are enabled based at least in part on the processor being subscribed to the deep learning service.

In some examples, the subscription component 540 may be configured as or otherwise support a means for determining that the processor has unsubscribed from a deep learning service associated with the deep learning device. In some examples, the communication disablement component 535 may be configured as or otherwise support a means for disabling the communications between the processor and the deep learning device based at least in part on the processor being unsubscribed from the deep learning service.

In some examples, to support enabling the communications between the processor and the deep learning device, the communication enablement component 530 may be configured as or otherwise support a means for enabling, based at least in part on a type of subscription of the processor to access the deep learning device, a first type of access to the deep learning device by the processor, where the first type of access supports a subset of the one or more operations associated with the processor to be performed by the deep learning device.

In some examples, a zonal computing system of a vehicle includes the memory system and the deep learning device, and the processor is a central processor of the zonal computing system or a gateway processor of the zonal computing system.

Figure 6:
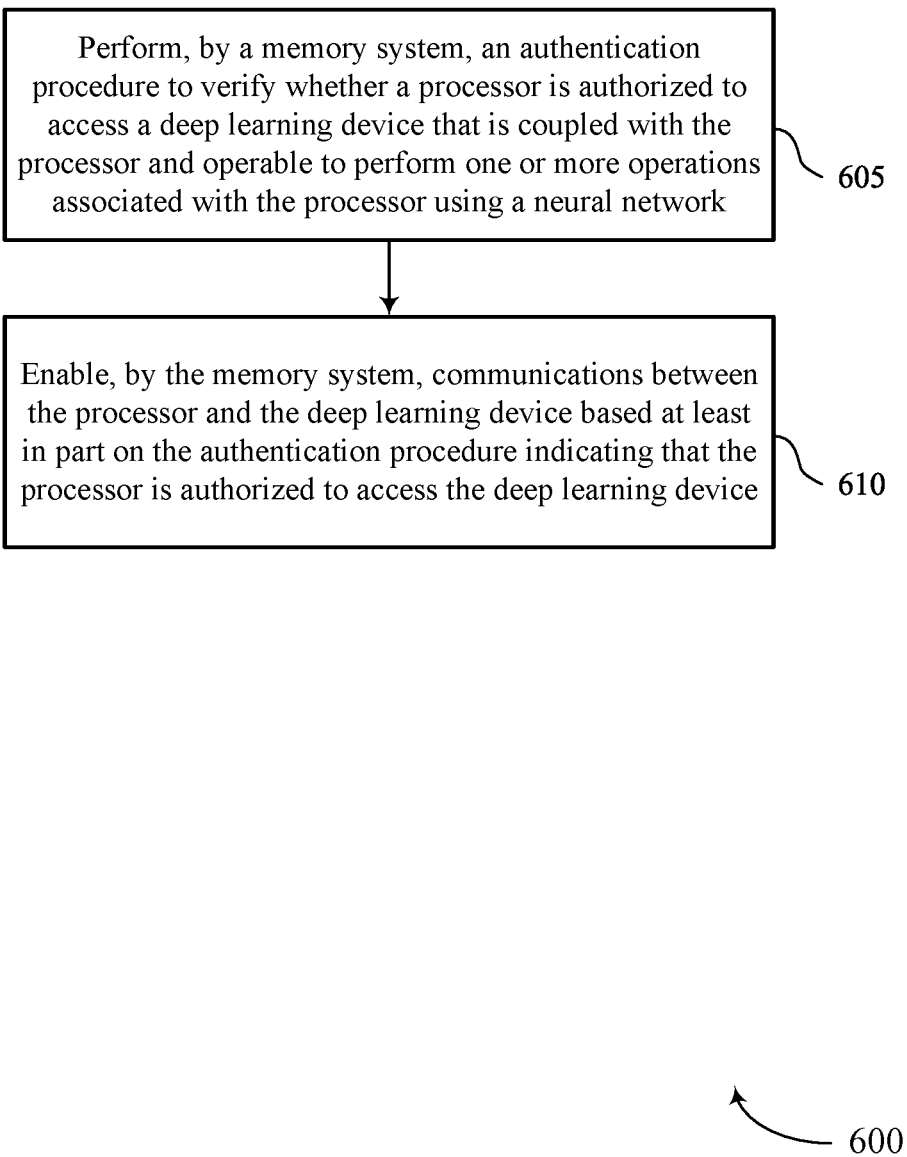
FIG. 6 shows a flowchart illustrating a method or methods that support deep learning access and authentication in a computing architecture in accordance with examples as disclosed herein.

FIG. 6 shows a flowchart illustrating a method 600 that supports deep learning access and authentication in a computing architecture in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include performing, by a memory system, an authentication procedure to verify whether a processor is authorized to access a deep learning device (e.g., a DLA) that is coupled with the processor and operable to perform one or more operations associated with the processor using a neural network. The operations of 605 may be performed in accordance with examples as disclosed herein. In some examples, aspects of the operations of 605 may be performed by an authentication component 525 as described with reference to FIG. 5.

At 610, the method may include enabling, by the memory system, communications between the processor and the deep learning device based at least in part on the authentication procedure indicating that the processor is authorized to access the deep learning device. The operations of 610 may be performed in accordance with examples as disclosed herein. In some examples, aspects of the operations of 610 may be performed by a communication enablement component 530 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for performing, by a memory system, an authentication procedure to verify whether a processor is authorized to access a deep learning device that is coupled with the processor and operable to perform one or more operations associated with the processor using a neural network and enabling, by the memory system, communications between the processor and the deep learning device based at least in part on the authentication procedure indicating that the processor is authorized to access the deep learning device.

Aspect 2: The method, apparatus, or non-transitory computer-readable medium of aspect 1 where a first die includes the deep learning device and a second die includes the memory system, and where enabling the communications between the processor and the deep learning device includes operations, features, circuitry, logic, means, or instructions, or any combination thereof for enabling an interface of the first die via which the processor accesses the deep learning device.

Aspect 3: The method, apparatus, or non-transitory computer-readable medium of aspect 1 where the deep learning device corresponds to one or more first layers and the memory system corresponds to one or more second layers, and where enabling the communications between the processor and the deep learning device includes operations, features, circuitry, logic, means, or instructions, or any combination thereof for enabling access to the one or more first layers corresponding to the deep learning device.

Aspect 4: The method, apparatus, or non-transitory computer-readable medium of aspect 1 where a memory die includes the deep learning device and the memory system, the memory die including a first interface via which the processor accesses the memory system and a second interface via which the processor accesses the deep learning device, and where enabling the communications between the processor and the deep learning device includes operations, features, circuitry, logic, means, or instructions, or any combination thereof for enabling the second interface via which the processor accesses the deep learning device.

Aspect 5: The method, apparatus, or non-transitory computer-readable medium of any of aspects 1 through 4, further including operations, features, circuitry, logic, means, or instructions, or any combination thereof for determining that the processor is authorized to access the deep learning device based at least in part on first identification information from the processor matching second identification information stored at the memory system, where the communications between the processor and the deep learning device are enabled based at least in part on the determination.

Aspect 6: The method, apparatus, or non-transitory computer-readable medium of any of aspects 1 through 5, further including operations, features, circuitry, logic, means, or instructions, or any combination thereof for determining, after enabling the communications between the processor and the deep learning device, that the processor is unauthorized to access the deep learning device based at least in part on first identification information from the processor being different from second identification information stored at the memory system and disabling access to the deep learning device by the processor based at least in part on the determination.

Aspect 7: The method, apparatus, or non-transitory computer-readable medium of any of aspects 1 through 6, further including operations, features, circuitry, logic, means, or instructions, or any combination thereof for determining that the processor is subscribed to a deep learning service associated with the deep learning device, where the communications between the processor and the deep learning device are enabled based at least in part on the processor being subscribed to the deep learning service.

Aspect 8: The method, apparatus, or non-transitory computer-readable medium of any of aspects 1 through 7, further including operations, features, circuitry, logic, means, or instructions, or any combination thereof for determining that the processor has unsubscribed from a deep learning service associated with the deep learning device and disabling the communications between the processor and the deep learning device based at least in part on the processor being unsubscribed from the deep learning service.

Aspect 9: The method, apparatus, or non-transitory computer-readable medium of any of aspects 1 through 8 where enabling the communications between the processor and the deep learning device includes operations, features, circuitry, logic, means, or instructions, or any combination thereof for enabling, based at least in part on a type of subscription of the processor to access the deep learning device, a first type of access to the deep learning device by the processor, where the first type of access supports a subset of the one or more operations associated with the processor to be performed by the deep learning device.

Aspect 10: The method, apparatus, or non-transitory computer-readable medium of any of aspects 1 through 9 where a zonal computing system of a vehicle includes the memory system and the deep learning device, and the processor is a central processor of the zonal computing system or a gateway processor of the zonal computing system.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 11: An apparatus, including: a processor; a deep learning device coupled with the processor that is operable to perform one or more operations associated with the processor using a neural network; and a memory system coupled with the processor and the deep learning device, where the memory system is operable to verify whether the processor is authorized to access the deep learning device and to enable or disable access to the deep learning device by the processor based at least in part on the verification.

Aspect 12: The apparatus of aspect 11, further including: a first die including the deep learning device, the first die including an interface via which the processor accesses the deep learning device; and a second die including the memory system, where the memory system is operable to enable or disable the interface based at least in part on the verification.

Aspect 13: The apparatus of aspect 11, where: the deep learning device corresponds to one or more first layers and the memory system corresponds to one or more second layers, and the memory system is operable to enable or disable access to the one or more first layers based at least in part on the verification.

Aspect 14: The apparatus of aspect 11, further including: a memory die including the deep learning device and the memory system, where the memory die includes a first interface via which the processor accesses the memory system and a second interface via which the processor accesses the deep learning device, and where the memory system is operable to enable or disable the second interface based at least in part on the verification.

Aspect 15: The apparatus of any of aspects 11 through 14, where the memory system is operable to: determine that the processor is authorized to access the deep learning device based at least in part on first identification information from the processor matching second identification information stored at the memory system; and enable access to the deep learning device by the processor based at least in part on the determination.

Aspect 16: The apparatus of any of aspects 11 through 15, where the memory system is operable to: determine that the processor is unauthorized to access the deep learning device based at least in part on first identification information from the processor being different from second identification information stored at the memory system; and disable access to the deep learning device by the processor based at least in part on the determination.

Aspect 17: The apparatus of any of aspects 11 through 16, where the memory system is operable to: determine that the processor is subscribed to a deep learning service associated with the deep learning device; and enable access to the deep learning device by the processor based at least in part on the processor being subscribed to the deep learning service.

Aspect 18: The apparatus of any of aspects 11 through 17, where the memory system is operable to: determine that the processor is unsubscribed from a deep learning service associated with the deep learning device; and disable access to the deep learning device by the processor based at least in part on the processor being unsubscribed from the deep learning service.

Aspect 19: The apparatus of any of aspects 11 through 18, where the memory system is operable to: enable, based at least in part on a type of subscription of the processor to access the deep learning device, a first type of access to the deep learning device by the processor, where the first type of access supports a subset of the one or more operations associated with the processor to be performed by the deep learning device.

Aspect 20: The apparatus of any of aspects 11 through 19, further including: a zonal computing system in a vehicle, the zonal computing system including: a central processor configured to communicate with a remote server and a plurality of zones associated with the zonal computing system; a gateway processor coupled with the central processor and associated with a zone of the plurality of zones, where the processor is the central processor or the gateway processor; and a device configured to interact with the vehicle or an environment associated with the vehicle and coupled with the gateway processor, where the gateway processor is configured to route communications between the central processor and the device.

An apparatus is described. The following provides an overview of aspects of the apparatus as described herein:

Aspect 21: An apparatus, including: a memory device; and a controller coupled with the memory device and operable to cause the apparatus to: perform an authentication procedure to verify whether a processor is authorized to access a deep learning device that is coupled with the processor and operable to perform one or more operations associated with the processor using a neural network; and enable communications between the processor and the deep learning device based at least in part on the authentication procedure indicating that the processor is authorized to access the deep learning device.

Aspect 22: The apparatus of aspect 21, where a first die includes the deep learning device and a second die includes the apparatus, and where, to enable the communications between the processor and the deep learning device, the controller is operable to cause the apparatus to: enable an interface of the first die via which the processor accesses the deep learning device.

Aspect 23: The apparatus of aspect 21, where a die includes the deep learning device and the apparatus, the die including a first interface via which the processor accesses the apparatus and a second interface via which the processor accesses the deep learning device, and where, to enable the communications between the processor and the deep learning device, the controller is operable to cause the apparatus to: enable the second interface via which the processor accesses the deep learning device.

Aspect 24: The apparatus of any of aspects 21 through 23, where the controller is further operable to cause the apparatus to: determine that the processor is authorized to access the deep learning device based at least in part on first identification information from the processor matching second identification information stored at the memory device, where the communications between the processor and the deep learning device are enabled based at least in part on the determination.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if" "when," "based on," or "based at least in part on" may be used interchangeably. In some examples, if the terms "if" "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
    a host system;
    a deep learning device coupled with the host system that is operable to perform one or more operations associated with the host system using a neural network; and
    a memory system coupled with the host system and the deep learning device, wherein the memory system is operable to:
        verify whether the host system is authorized to access the deep learning device and to enable or disable access to the deep learning device by the host system based at least in part on the verification; and
        enable, based at least in part on a type of subscription of the host system to access the deep learning device, a first type of access to the deep learning device by the host system, wherein the first type of access supports a subset of the one or more operations associated with the host system to be performed by the deep learning device.

2. An apparatus, comprising:
    a processor;
    a first die comprising a deep learning device coupled with the processor that is operable to perform one or more operations associated with the processor using a neural network, the first die comprising an interface via which the processor accesses the deep learning device; and
    a second die comprising a memory system coupled with the processor and the deep learning device, wherein the memory system is operable to verify whether the processor is authorized to access the deep learning device and to enable or disable access to the deep learning device by the processor and the interface based at least in part on the verification.

3. The apparatus of claim 2, wherein the memory system is operable to:
    determine that the processor is authorized to access the deep learning device based at least in part on first identification information from the processor matching second identification information stored at the memory system; and
    enable access to the deep learning device by the processor based at least in part on the determination.

4. The apparatus of claim 2, wherein the memory system is operable to:
    determine that the processor is unauthorized to access the deep learning device based at least in part on first identification information from the processor being different from second identification information stored at the memory system; and
    disable access to the deep learning device by the processor based at least in part on the determination.

5. The apparatus of claim 2, wherein the memory system is operable to:
    determine that the processor is subscribed to a deep learning service associated with the deep learning device; and
    enable access to the deep learning device by the processor based at least in part on the processor being subscribed to the deep learning service.

6. The apparatus of claim 2, wherein the memory system is operable to:
    determine that the processor is unsubscribed from a deep learning service associated with the deep learning device; and
    disable access to the deep learning device by the processor based at least in part on the processor being unsubscribed from the deep learning service.

7. The apparatus of claim 2, further comprising:
    a zonal computing system in a vehicle, the zonal computing system comprising:
        a central processor configured to communicate with a remote server and a plurality of zones associated with the zonal computing system;
        a gateway processor coupled with the central processor and associated with a zone of the plurality of zones, wherein the processor comprises the central processor or the gateway processor; and
        a device configured to interact with the vehicle or an environment associated with the vehicle and coupled with the gateway processor, wherein the gateway processor is configured to route communications between the central processor and the device.

8. An apparatus, comprising:
    a processor;
    a deep learning device coupled with the processor that is operable to perform one or more operations associated with the processor using a neural network, wherein the deep learning device corresponds to one or more first layers; and
    a memory system coupled with the processor and the deep learning device, wherein the memory system corresponds to one or more second layers, and wherein the memory system is operable to verify whether the processor is authorized to access the deep learning device and to enable or disable access to the one or more first layers corresponding to the deep learning device by the processor based at least in part on the verification.

9. An apparatus, comprising:
a processor;
a deep learning device coupled with the processor that is operable to perform one or more operations associated with the processor using a neural network;
a memory system coupled with the processor and the deep learning device, wherein the memory system is operable to verify whether the processor is authorized to access the deep learning device and to enable or disable access to the deep learning device by the processor based at least in part on the verification; and
a memory die comprising the deep learning device and the memory system, wherein the memory die comprises a first interface via which the processor accesses the memory system and a second interface via which the processor accesses the deep learning device, and wherein the memory system is operable to enable or disable the second interface based at least in part on the verification.

10. A method, comprising:
performing, by a memory system, an authentication procedure to verify whether a processor is authorized to access a deep learning device that is coupled with the processor and operable to perform one or more operations associated with the processor using a neural network wherein a first die comprises the deep learning device and a second die comprises the memory system; and
enabling, by the memory system, communications between the processor and the deep learning device based at least in part on the authentication procedure indicating that the processor is authorized to access the deep learning device wherein the processor accesses the deep learning device via enabling an interface of the first die.

11. The method of claim 10, further comprising:
determining that the processor is authorized to access the deep learning device based at least in part on first identification information from the processor matching second identification information stored at the memory system,
wherein the communications between the processor and the deep learning device are enabled based at least in part on the determination.

12. The method of claim 10, further comprising:
determining, after enabling the communications between the processor and the deep learning device, that the processor is unauthorized to access the deep learning device based at least in part on first identification information from the processor being different from second identification information stored at the memory system; and
disabling access to the deep learning device by the processor based at least in part on the determination.

13. The method of claim 10, further comprising:
determining that the processor is subscribed to a deep learning service associated with the deep learning device, wherein the communications between the processor and the deep learning device are enabled based at least in part on the processor being subscribed to the deep learning service.

14. The method of claim 10, further comprising:
determining that the processor has unsubscribed from a deep learning service associated with the deep learning device; and
disabling the communications between the processor and the deep learning device based at least in part on the processor being unsubscribed from the deep learning service.

15. The method of claim 10, wherein enabling the communications between the processor and the deep learning device comprises:
enabling, based at least in part on a type of subscription of the processor to access the deep learning device, a first type of access to the deep learning device by the processor, wherein the first type of access supports a subset of the one or more operations associated with the processor to be performed by the deep learning device.

16. The method of claim 10, wherein a zonal computing system of a vehicle comprises the memory system and the deep learning device, and the processor is a central processor of the zonal computing system or a gateway processor of the zonal computing system.

17. An apparatus, comprising:
a memory device; and
a controller coupled with the memory device and operable to cause the apparatus to:
perform an authentication procedure to verify whether a processor is authorized to access a deep learning device that is coupled with the processor and operable to perform one or more operations associated with the processor using a neural network wherein a die comprises the deep learning device and the apparatus, the die comprising a first interface via which the processor accesses the apparatus and a second interface via which the processor accesses the deep learning device; and
enable communications between the processor and the deep learning device based at least in part on the authentication procedure indicating that the processor is authorized to access the deep learning device wherein the processor accesses the deep learning device via enabling the second interface.

18. The apparatus of claim 17, wherein the controller is further operable to cause the apparatus to:
determine that the processor is authorized to access the deep learning device based at least in part on first identification information from the processor matching second identification information stored at the memory device, wherein the communications between the processor and the deep learning device are enabled based at least in part on the determination.

* * * * *